United States Patent [19]

Keogh

[11] 4,452,937
[45] * Jun. 5, 1984

[54] ETHYLENE POLYMER COMPOSITIONS STABILIZED AGAINST WATER TREEING AND ELECTRICAL TREEING BY AN ORGANO TITANIUM CHELATE; AND THE USE THEREOF AS INSULATION ABOUT ELECTRICAL CONDUCTORS

[75] Inventor: Michael J. Keogh, Bridgewater, N.J.

[73] Assignee: Union Carbide Corporation, Danbury, Conn.

[*] Notice: The portion of the term of this patent subsequent to Jan. 18, 2000 has been disclaimed.

[21] Appl. No.: 439,172

[22] Filed: Nov. 5, 1982

Related U.S. Application Data

[63] Continuation-in-part of Ser. No. 218,794, Dec. 22, 1980, Pat. No. 4,369,331.

[51] Int. Cl.³ .............................................. C08F 10/02
[52] U.S. Cl. .................................... 524/398; 524/333; 428/389; 174/110 SR; 174/110 PM
[58] Field of Search ................. 174/110 SR, 110 PM; 428/389; 524/333, 390

[56] References Cited

U.S. PATENT DOCUMENTS

| | | | |
|---|---|---|---|
| 2,549,940 | 4/1951 | Kignaigo | 260/89.1 |
| 2,720,468 | 10/1955 | Shacklett | 117/34 |
| 2,917,414 | 12/1959 | McLean | 117/221 |
| 2,984,641 | 5/1961 | Wolinski | 525/4 |
| 3,103,490 | 9/1963 | Green | 252/15 |
| 3,418,348 | 12/1968 | Shepard et al. | 260/429.5 |
| 3,491,075 | 1/1970 | Deaking | 260/87.3 |
| 3,646,155 | 2/1972 | Scott | 260/827 |
| 3,923,731 | 12/1975 | MacKenzie, Jr. | 260/42.9 |
| 4,020,214 | 4/1977 | MacKenzie, Jr. | 428/389 |
| 4,029,830 | 6/1977 | Yamamoto et al. | 527/57 |
| 4,172,189 | 10/1979 | Muller et al. | 525/330 |
| 4,206,260 | 6/1980 | McMahon | 428/379 |
| 4,291,136 | 9/1981 | Keogh | 525/102 |
| 4,299,713 | 11/1981 | Moringer et al. | 174/110 SR |
| 4,351,926 | 9/1982 | Keogh | 525/370 |

FOREIGN PATENT DOCUMENTS 0004752 10/1979 European Pat. Off. .

Primary Examiner—Paul R. Michl
Assistant Examiner—Aex H. Walker
Attorney, Agent, or Firm—James C. Arvantes; Robert C. Brown

[57] ABSTRACT

The disclosure of this application is directed to a composition, devoid of added mineral filler, comprising an ethylene polymer and an organo titanium chelate as a water treeing inhibitor. The compositions can be extruded about electrical conductors providing insulation thereon which is resistant to deterioration in the presence of moisture and/or an electrical field.

12 Claims, No Drawings

ETHYLENE POLYMER COMPOSITIONS STABILIZED AGAINST WATER TREEING AND ELECTRICAL TREEING BY AN ORGANO TITANIUM CHELATE; AND THE USE THEREOF AS INSULATION ABOUT ELECTRICAL CONDUCTORS

This application is a continuation-in-part of my copending application Ser. No. 218,794 filed Dec. 22, 1980 now U.S. Pat. No. 4,369,331 granted Jan. 18, 1983.

SUMMARY OF THE INVENTION

This invention relates to ethylene polymer compositions, devoid of added mineral fillers, which are stabilized against water treeing and electrical treeing by the addition thereto of organo titanium chelates. The compositions of this invention, containing organo titanium chelates, are particularly useful as extrudates about electrical conductors providing insulation thereon which is resistant to deterioration in the presence of moisture and/or an electrical field, as evidenced by resistivity to water treeing and electrical treeing.

BACKGROUND OF THE INVENTION

Ethylene polymers have been modified by the addition thereto of mineral fillers and organo silanes for the purpose of providing compositions which have improved resistivity to moisture and consequently improved electrical properties as disclosed in U.S. Pat. No. 3,957,719 granted May 18, 1976. For example, organo silanes such as vinyl tris(2-methoxyethoxy) silane have been added to polyethylene compositions containing clay and the resultant compositions suggested for use as insulation about electrical cables. Such compositions, however, have been found deficient when used as insulation about cables carrying high voltage current, on the order of at least five kilovolts. In such cases, it has been found necessary to subject the compositions to a prolonged heat treatment in order that the resultant insulated cables have an acceptable low power factor.

Compositions have also been formulated based on ethylene polymers, mineral fillers and organo titanates and used as insulation about electrical conductors as disclosed in U.S. Pat. No. 4,020,214 granted Apr. 26, 1977. An ethylene polymer composition containing a mineral filler and an organo titanate has not been found acceptable for use as insulation about electrical conductors carrying high voltage current as such composition impairs the transmission efficiency of the insulated electrical conductor.

DESCRIPTION OF THE INVENTION

The present invention provides compositions, based on ethylene polymers, which can be successfully used as insulation about conductors carrying high voltage current without the necessity of subjecting the compositions to a subsequent heating step in order that the resultant, insulated electrical conductors have an acceptable low power factor. Also, compositions of this invention, when used as insulation about electrical conductors, such as copper wires and cables, are relatively free of points of high electrical stress, found in systems containing mineral fillers. Points of high electrical stress are due to the agglomeration of mineral fillers and lead to eventual failure of the insulation. Furthermore, electrical conductors, insulated with the compositions of the present invention, are characterized by improved transmission efficiency.

Compositions of this invention are also characterized by a number of additional advantageous properties. For example, the organo titanium chelates, in the ethylene polymer compositions, will hydrolyze slowly and form a by-product which itself serves as a water tree growth inhibitor. As an illustration, an organo titanium chelate formed on reacting dodecanol, phenyl salicylate and tetraisopropyl titanate, in a mole ratio of 3 to 1 to 1, will hydrolyze to phenyl salicylate, which serves as a non-fugitive water treeing inhibitor. In effect, organo titanium chelates, properly selected for hydrolysis rates, will serve as "contact tablets" for slow release of water tree growth inhibitors.

In addition, ethylene polymer compositions, containing organo titanium chelates and used as insulation about electrical conductors, have extended work lives due in part to:

1. Compatibility of the organo titanium chelates with the ethylene polymers.
2. Negligible tendency of the organo titanium chelates to migrate to the surface of the compositions, i.e. to "sweat out."
3. Negligible tendency of the organo titanium chelates to migrate into the semi-conductive layers of the insulated electrical conductors.

So-called "sweat out" and migration into the semi-conductive layers by the organo titanium chelates could cause problems, such as development of corona discharge, leading to dielectric failure of the insulated electrical conductors.

Finally, as an additional advantage, the ethylene polymer compositions of this invention are resistant, not only to the growth of water trees, but also to the growth of electrical trees.

The compositions of this invention are devoid of added mineral fillers and comprise an ethylene polymer and an organo titanium chelate wherein the chelate is present in an amount sufficient to improve the water treeing resistance thereof. Generally the organo titanium chelate is present in an amount of about 0.1 to about 5 percent by weight, preferably in an amount of about 0.5 to about 2 percent by weight, based on the weight of the ethylene polymer.

The organo titanium chelates, used to formulate the compositions of this invention, are known compounds and can be conveniently represented by the following formula:

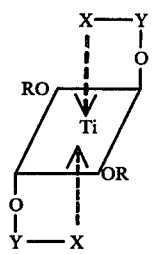

wherein X represents oxygen or nitrogen, Y represents a two or three carbon chain and R may be alkyl or the ligand X—Y—OH, wherein x and y are as defined.

Illustrative of organo titanium chelates are the following: tetraoctylene glycol titanium, triethanol amine titanate, titanium acetyl acetonate, titanium lactate, chelate of dodecanol, phenyl salicylate and tetraisopropyl titanate, chelate of isopropyl-tri-decyl titanate and phenyl salicylate, chelate of tetrabutyl titanate and phenyl salicylate, chelate of isopropyl-tri-decyl titanate and phenyl-2-hydroxy-3-naphthoate and the like.

It is to be understood that mixtures of chelates can be used if so desired.

The ethylene polymers which are used in the compositions of the present invention are solid (at 25° C.) materials which may be homopolymers, or copolymers of ethylene. The ethylene copolymers contain at least 30 weight percent of ethylene and up to about 70 weight percent of propylene, and/or up to about 50 weight percent of one or more other organic compounds which are interpolymerizable with ethylene. These other compounds which are interpolymerizable with ethylene are preferably those which contain polymerizable unsaturation, such as is present in compounds containing an ethylene linkage:

$$>C=C<$$

These other interpolymerizable compounds may be α-olefins such as, butene-1, pentene-1, octene-1 and the like. Vinyl compounds, such as vinyl acetate and ethyl acrylate may also be interpolymerized with ethylene up to a maximum content of about 5 percent by weight.

Preferred copolymers are ethylene/ethyl acrylate copolymers, ethylene/propylene copolymers, ethylene/butene copolymers and the like.

Also included in the term polymer are blends of one polymer with one or more other polymers. Illustrative of such blends are polyethylene with polypropylene, low-density polyethylene with high-density polyethylene, and polyethylene with olefin copolymers such as these indicated above.

The low-density ethylene copolymers with α-olefins may be made under low pressure conditions of about 150 to 300 psi with supported chromium oxide based catalysts that are modified with titanium and optionally, fluorine, as disclosed in U.S. Pat. Nos. 3,666,736 and 4,011,382. The disclosures of these patents are included herein by reference.

Suitable ethylene polymers have a density (ASTM 1505 test procedure with conditioning as in ASTM D-1248-72) of about 0.86 to 0.96 grams/cubic centimeter and a melt index (ASTM D-1238 at 44 psi test pressure) of about 0.1 to 10 decigrams per minute.

In addition to the ethylene polymer and the organo titanium chelate, the compositions of the present invention can also contain crosslinking agents when the compositions are to be chemically crosslinked. These chemical vulcanizing, curing or crosslinking agents are well known to those in the art and include the organic peroxide type of crosslinking agents which are disclosed for example, in U.S. Pat. Nos. 2,826,570, 2,888,424, 2,916,471, 3,079,370 and 3,296,189, the disclosures of these patents being incorporated herein by reference. The chemical crosslinking agents may be used individually or in combination with one another, and they are used in crosslinking amounts. The preferred crosslinking agent is di-α-cumyl peroxide.

The compositions of the present invention can also contain one or more suitable high temperature antioxidants for the ethylene polymer. The antioxidants include sterically hindered phenols or amines, polymerized 2,2,4-trimethyl dihydroquinoline, thiodiethylene-bis(3,5-ditertbutyl-4-hydroxy) hydrocinnamate, distearylthiodipropionate and the like.

Other additives which can be employed in the compositions of the present invention would include additives commonly employed in ethylene polymer based dielectric compositions, including lubricants, oil extenders, dyes and colorants and metal deactivators.

The compositions of the present invention can also be extended with polymers, other than the ethylene polymer, which are compatible, i.e., can be physically blended or alloyed, or grafted, with the ethylene polymer. The resultant compositions should contain at least about 30 weight percent of interpolymerized ethylene in all the polymers that may be present in the composition, based on the total weight of the resultant composition. The other polymers which can be used include polypropylene, rubbers or elastomers such as styrene-butadiene block copolymers, urethane elastomers, polyester elastomers, natural rubber and the like.

The total amount of additives will range from 0 to about 60 weight percent, preferably 0 to 10 weight percent based on the total weight of the composition.

The following examples further illustrate the present invention and are not intended to limit the scope thereof in any manner.

Compositions were formulated, tested and rated for WTGR (Water Tree Growth Resistance) against a relative WTGR of 1.0 for a Control.

The water tree growth resistance of a composition containing a commercial grade of polyethylene homopolymer having a melt index of 0.2 dg/min. and a density of 0.92 grams/cubic centimeter and 0.10 percent by weight of 4,4'-thiobis(3-methyl-6-tert-butyl phenol) was determined by the procedure described in U.S. Pat. No. 4,212,756 granted Mar. 13, 1979, the disclosure of which is incorporated herein by reference. This composition had a relative value of 1.0 for water tree growth resistance.

A series of compositions were formulated and tested for WTGR. Each composition was prepared by admixing the ethylene polymer and chelate in a Brabender mixer at a temperature of 155° C. until homogeniety was reached. Once homogeniety was reached, a heat stabilizer was added to the composition and mixing continued to a homogeneous mixture. Contents of the Brabender were discharged and stored under argon until tested for water tree growth resistance (WTGR) as described in U.S. Pat. No. 4,212,756.

Also, compositions were formulated and tested for electrical tree growth resistance according to ASTM test D 3776-79 and compared to a standard composition of a commercial grade polyethylene, as described for the WTGR test, containing 0.1 percent by weight 4,4'-thiobis(3-methyl-6-tert-butyl phenol). The control had a relative value of 10.0 for electrical tree growth resistance.

| FORMULATION | COMPOSITIONS-PERCENT BY WEIGHT | | | | |
|---|---|---|---|---|---|
| | 1 | 2 | 3 | 4 | 5 |
| Polyethylene Melt index - 0.2 dg/min Density - 0.92 grams/cc | 98.9 | 97.9 | 97.7 | 98.3 | 97.4 |
| 4, 4'-thiobis(3-methyl-6-tert-butyl phenol)* | 0.1 | 0.1 | 0.1 | 0.1 | 0.1 |
| Tetraoctylene glycol titanium chelate | 1.0 | — | — | — | — |
| Chelate A | — | 2.0 | — | — | — |
| Chelate B | — | — | 2.2 | — | — |
| Chelate C | — | — | — | 1.6 | — |
| Chelate D | — | — | — | — | 2.5 |

| FORMULATION | COMPOSITIONS— PERCENT BY WEIGHT | | | | |
|---|---|---|---|---|---|
| | 1 | 2 | 3 | 4 | 5 |
| WTGR | 0.17 | 0.045 | 0.17 | — | — |
| Resistivity to growth of electrical trees | | | | | |
| • Without aging | 12.5 | 24 | 21 | 22 | 16.5 |
| • Heated for 7 days at a temperature of 85° C., under vacuum before testing | — | 16 | 19 | 22 | — |

*Heat Stabilizer

CHELATE A

Prepared by reacting a mixture of dodecanol, phenyl salicylate and tetraisopropyl titanate in a mole ratio of 3 to 1 to 1.

CHELATE B

Prepared by reacting a mixture of isopropyl-tridecyl titanate and phenyl salicylate in a mole ratio of 1 to 1.

CHELATE C

Prepared by reacting a mixture of tetrabutyl titanate and phenyl salicylate in a mole ration of 1 to 2.

CHELATE D

Prepared by reacting a mixture of isopropyl-tridecyl titanate and phenyl-2-hydroxy-3-naphthoate in a mole ratio of 1 to 1.

What is claimed is:

1. A polymer composition, devoid of added mineral filler, comprising polyethylene and an organo titanium chelate having the general formula:

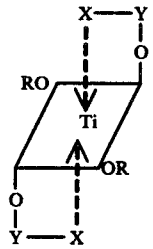

where X is oxygen or nitrogen, Y is a two or three carbon chain and R is alkyl or the ligand X—Y—OH wherein X and Y are as defined, said chelate being selected from the group consisting of tetraoctylene glycol titanium chelate, dodecanol phenyl salicylate tetraisopropyl titanium chelate, phenyl salicylate isopropyl-tri-decyl titanium chelate, phenyl salicylate tetrabutyl titanium chelate, phenyl-2-hydroxy-3-naphthoate isopropyl-tri-decyl titanium chelate and triethanol amine titanium chelate, said chelate being present in an amount sufficient to improve the water treeing resistance of said composition.

2. A composition as defined in claim 1 wherein said chelate is present in an amount of about 0.1 to about 5 percent by weight.

3. A composition as defined in claim 1 wherein the said organo chelate is present in an amount of about 0.5 to about 2 percent by weight.

4. A composition as defined in claim 1 wherein the said chelate is tetraoctylene glycol titanium chelate.

5. A composition as defined in claim 1 wherein the said chelate is a dodecanol phenyl salicylate tetraisopropyl titanium chelate.

6. A composition as defined in claim 1 wherein the said chelate is a phenyl salicylate isopropyl-tri-decyl titanium chelate.

7. A composition as defined in claim 1 wherein the said chelate is a phenyl salicylate tetrabutyl titanium chelate.

8. A composition as defined in claim 1 wherein the said chelate is a phenyl-2-hydroxy-3-naphthoate isopropyl-tri-decyl titanium chelate.

9. A composition as defined in claim 1 containing an organic peroxide.

10. The cured product of the composition defined in claim 9.

11. An electrical conductor insulated with the composition or the cured product of the composition defined in claim 1.

12. A composition as defined in claim 1 wherein the said chelate is triethanol amine titanium chelate.

* * * * *